United States Patent [19]

Meliconi

[11] Patent Number: 4,809,723

[45] Date of Patent: Mar. 7, 1989

[54] APPLIANCE FOR WASHING AND SPIN DRYING LETTUCE, VEGETABLES AND SIMILAR PRODUCE

[75] Inventor: Riccardo Meliconi, Granarolo Emilia, Italy

[73] Assignee: Meliconi, S.r.L., Bologna, Italy

[21] Appl. No.: 157,463

[22] Filed: Feb. 17, 1988

[30] Foreign Application Priority Data

Feb. 27, 1987 [IT] Italy .................................. 4780/87[U]

[51] Int. Cl.⁴ .............................................. B08B 3/04
[52] U.S. Cl. .................... 134/159; 134/162; 134/200; 99/536
[58] Field of Search ............... 134/137, 140, 143, 148, 134/153, 155, 157, 159, 162, 200; 68/139, 142; 99/516, 536

[56] References Cited

U.S. PATENT DOCUMENTS

| 76,399 | 4/1868 | Chanlin ........................ 134/157 |
| 130,786 | 8/1872 | Wright ........................... 68/142 |
| 265,570 | 10/1882 | Burtner et al. .................. 68/142 |
| 350,758 | 10/1886 | McCallister et al. ............. 68/142 |
| 377,829 | 2/1888 | Johnson ........................ 68/142 |
| 513,374 | 1/1894 | Walter ........................... 68/142 |
| 1,588,622 | 6/1926 | Savoy ........................... 68/142 |
| 1,850,951 | 3/1932 | Allbright ..................... 68/142 X |
| 2,262,955 | 11/1941 | Miller .......................... 68/142 |
| 2,483,676 | 10/1949 | Slutsky ..................... 68/142 X |
| 3,428,059 | 2/1969 | Wenzel et al. ............. 134/159 X |
| 4,142,541 | 3/1979 | Bossert et al. ............. 134/159 X |
| 4,236,541 | 12/1980 | Cipriani ..................... 134/140 X |

Primary Examiner—Harvey C. Hornsby
Assistant Examiner—Frankie L. Stinson
Attorney, Agent, or Firm—Fay, Sharpe, Beall, Fagan, Minnich & McKee

[57] ABSTRACT

An appliance for washing and spin-drying lettuce, vegetables and similar produce, comprising a basket that separates into at least two parts and is rotatable about a horizontal axis of symmetry internally of a container fitted uppermost with a removable lid. The basket is rotated, supported, and held in alignment by relative driving and idle trunnion assemblies fitted to the two opposite side walls of the container.

12 Claims, 4 Drawing Sheets

APPLIANCE FOR WASHING AND SPIN DRYING LETTUCE, VEGETABLES AND SIMILAR PRODUCE

BACKGROUND OF THE INVENTION

The invention relates to a domestic appliance for washing and spin drying lettuce, vegetables and similar produce.

The prior art embraces devices for washing, and especially for spin drying salad greens, such as lettuce and the like, consisting in a revolving basket that is rotatable about its own vertical axis of symmetry internally of a container fitted with a removable lid.

In most embodiments, the container incorporates a centrally located upright conical pivot serving to align and support the revolving basket. The lid acts as a support for a cranking handle, which is mounted externally, and for an internal drive mechanism that associates with the basket and causes it to rotate. Cranking the handle, the revolving basket can be set in motion, and the washed produce contained therein will be subjected to a centrifugal force capable of separating the water from the surface of the leaves.

It will often happen, however, that for produce to dry completely, it must be rearranged internally of the basket, and the basket spun a second time.

This extra spin can be effected to advantage only after having removed the lid, poured off the water which has collected at the bottom of the container, rearranged the produce in the basket, and replaced the lid.

Accordingly, the object of the invention is one of providing a practical and inexpensive solution to the aforementioned drawback.

SUMMARY OF THE INVENTION

The stated object is achieved with an appliance as disclosed and claimed herein.

The drawback in question is overcome in such an appliance by incorporation of a cylindrical basket having a horizontally disposed axis of symmetry and rotation; furthermore, the means by which the basket is set in rotation are located at the side of the appliance, and the container is provided with at least one bottom outlet of variable aperture from which to drain off water.

One of the advantages of the invention consists essentially in simplicity of construction and use, resulting in a highly practical appliance. Practical advantage is derived principally from the fact of having adopted a side-mounted basket drive mechanism that eliminates any problems connected with laying hold on the container.

Another advantage of the invention is that washing and spinning can be accomplished without removing either the produce or the basket between one step and the other. This becomes possible by virtue of having fitted the bottom of the container with the variable flow outlets, which can be kept closed at first in order to wash the produce in a requisite quantity of water, and opened up thereafter for the purposes of spin drying.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
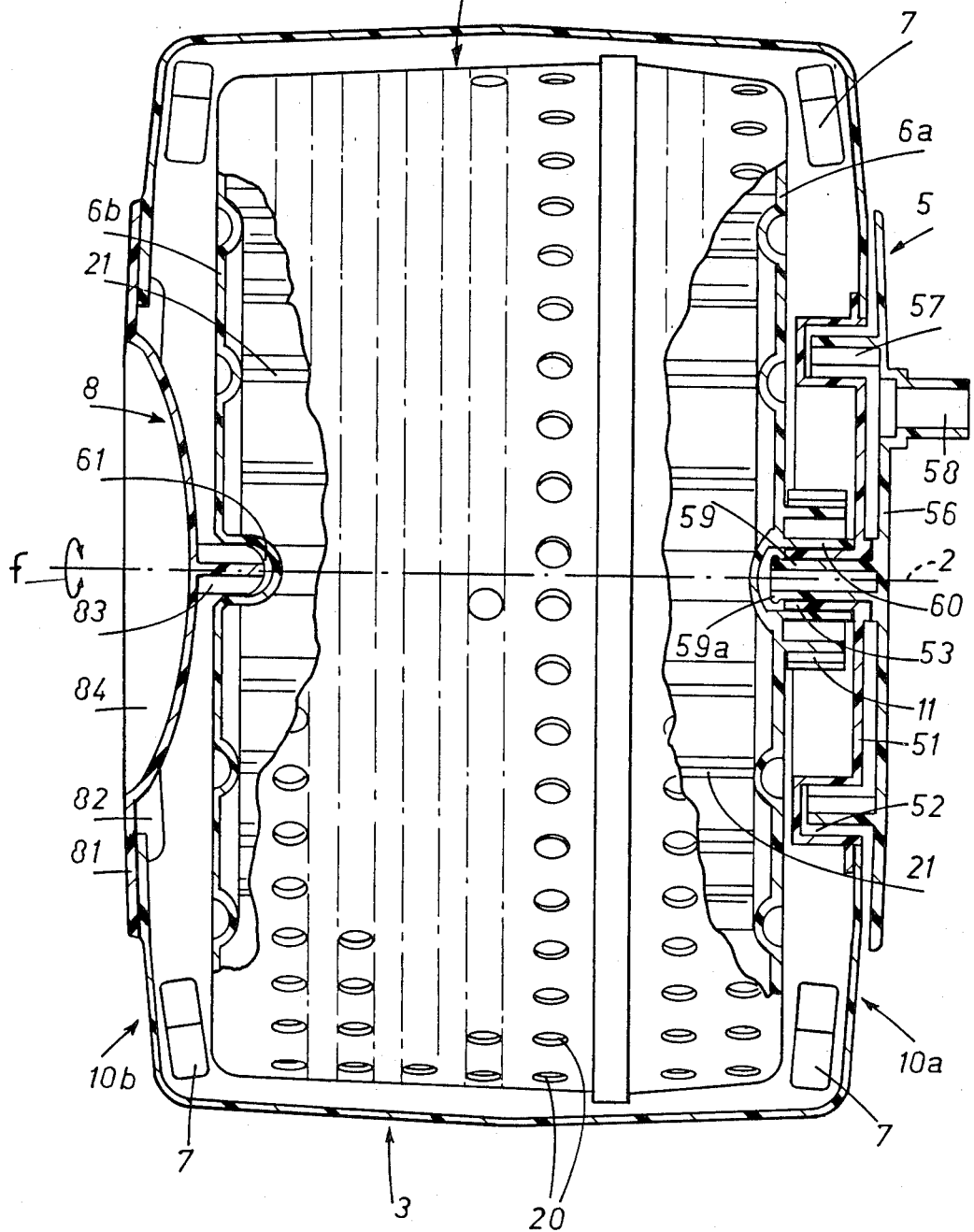
FIG. 1 shows a longitudinal section through the appliance disclosed, in which the basket is viewed from above with certain parts cut away better to reveal others.
Figure 2:
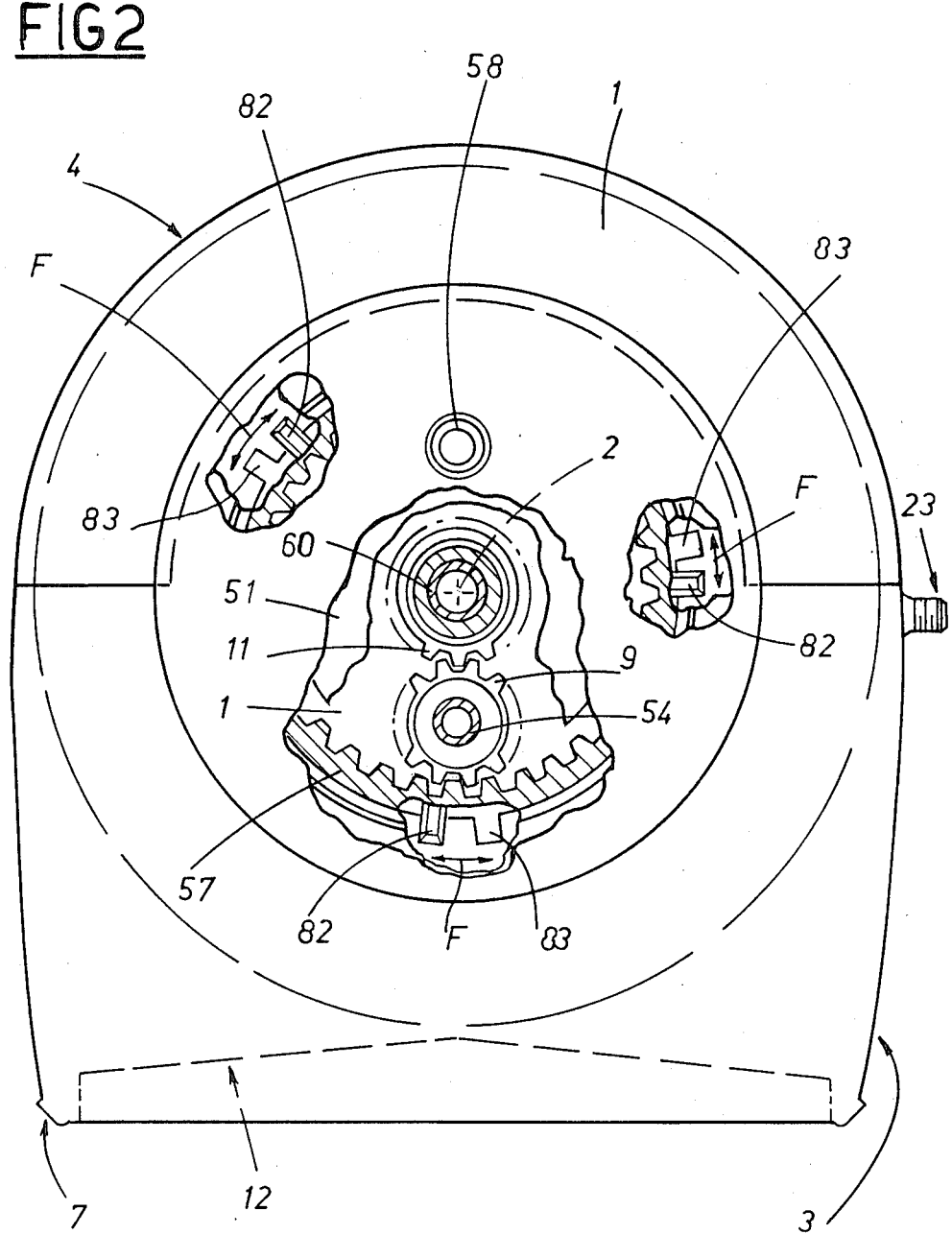
FIG. 2 is a side elevation of the appliance in which certain parts are cut away better to reveal others.

Referring to FIGS. 1 and 2, an appliance according to the invention consists essentially in a container 3, enclosed by a lid 4 and encompassing a basket 1 that has a horizontal axis of symmetry, denoted 2, and is journalled at each side: on the one hand, associated with drive means 5 by which it is set in rotation; on the other, supported and aligned in such rotation by means 8 that are described more fully below.

The basket 1 is substantially cylindrical, and has an open lattice structure, e.g. perforated, or slotted, etc., that enables water to drain from its interior.

FIG. 1 illustrates one possible embodiment of the basket 1, which in this instance is perforated with a plurality of holes 20.

The basket 1 separates into two parts, in such a way as to afford access to its interior and enable the introduction and removal of produce. The two parts making up the basket 1 lock together and break apart in quick fit arrangement, shown schematically in FIG. 1, which enables rotation to be transmitted from the one part to the other. The inside wall of the basket is embodied with a set of ribs 21 which converge substantially toward center, and favour a reshuffling motion of the produce inside the basket when being washed or spun.

5 denotes means that support and drive the basket 1 and are associated, according to the invention, with the side wall 10a of the container 3. Such means 5 consist in a cover 51, disposed coaxial with and rigidly attached to the container 3 (conventionally, welded direct to the side wall 10a using ultrasonic methods), which incorporates a concentric, outward facing annular recess 52, a first pivot 53, hollow and centrally positioned, to which the basket 1 is journalled, and a second pivot 54 that is offset from the axis of rotation 2 (see FIGS. 2, 3 and 4) and carries a planet gear 9 in mesh with a gear 11 attached directly to the basket 1.

Figure 4:
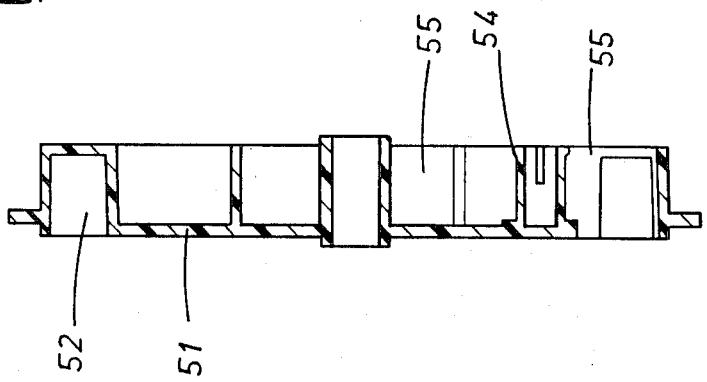
FIG. 4 is the section through IV—IV in FIG. 3.
Figure 3:
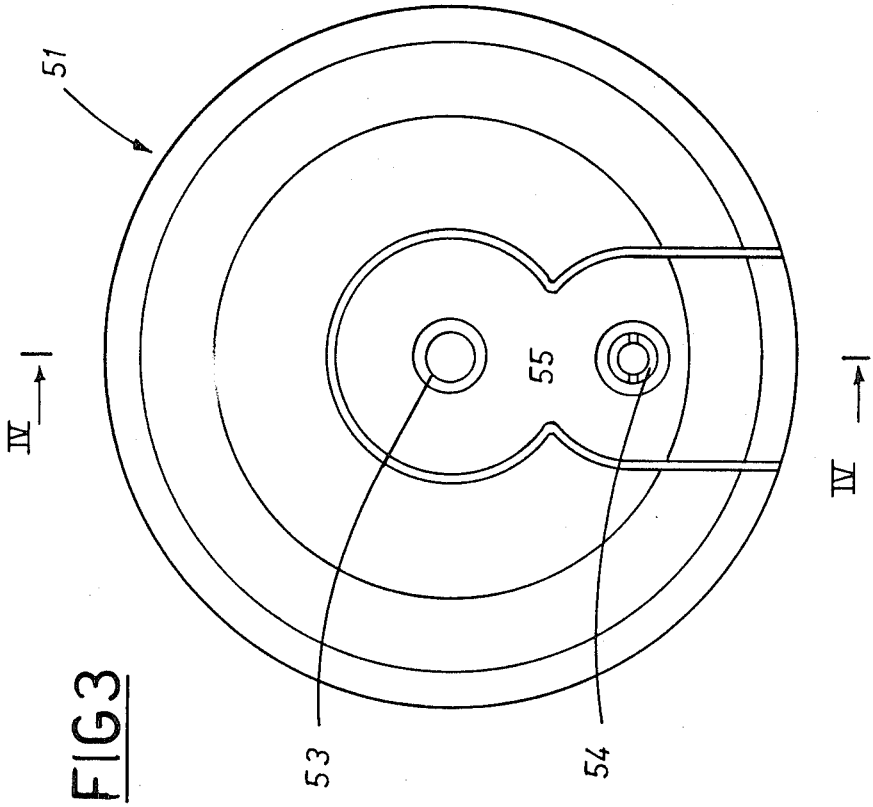
FIG. 3 illustrates a structural component of the appliance disclosed, viewed in side elevation.

It will be seen from FIGS. 3 and 4 that the cover 51 affords an opening, denoted 55; this serves to admit the planet gear 9 and enable its attachment to the second pivot 54.

Besides supporting the revolving basket 1, the first, hollow pivot 53 freely accommodates a further, diametrally flexible pivot 59 that terminates at one projecting end in a ring 59a, by which it is locked axially in relation to the hollow pivot 53, and is directly connected at the remaining end to a disk 56, the inside face of which is breasted frontally with the cover 51.

57 denotes an internal ring gear integral with the inside face of the disk 56, which is accommodated by the annular recess 52 and meshes with the planet gear 9, whilst 58 denotes a knob that issues from the outside face of the disk 56 and provides the means by which the disk can be gripped and rotated.

The ring gear 57, the planet gear 9, and the gear 11 attached to the basket 1 create an epicyclic train by which the entire basket is set in rotation. The side wall 6a of the basket 1 that faces toward the cover 51 exhibits a centrally located bush 60 which carries the aforesaid gear 11 on its outer surface, and accommodates the first pivot 53 of the cover 51, and with it, the pivot 59 connected to the disk 56, both coaxially.

10b denotes the side of the container 3, opposite the side denoted 10a, with which the aforementioned support and alignment means 8 are associated.

Such means 8 consist in a cover 81 the inside face of which (that directed toward the basket) affords a pivot 83, centrally located and coaxial with the axis of rotation 2, by which the basket is supported in rotation and aligned; the pivot 83 penetrates and registers internally of a further bush 61 afforded by the side wall 6b of the basket opposite from the side wall 6a already mentioned. 82 denotes means by which the cover 81 is attached to and centered in the relative side wall 10a of the container 3; such means 82 are embodied as a set of three inward facing L-shaped lugs disposed parallel with the cover 81, distanced 120° one from the next, and designed to engage in corresponding slots 83 provided in the wall 10b of the container.

The cover 81 in question can thus be fitted to and removed from the container 3 by means of the lugs 82. The removable cover 81 also incorporates a web 84, located centrally and issuing from the side opposite that of the pivot 83, that can be gripped to the end of rotating the cover itself in either one of the directions indicated by the arrow f (FIGS. 1 and 2), when fitted to the side wall 10b with the lugs 82 located in their respective slots 83.

Removal and separation of the basket 1 is simple to effect: first, the cover 81 is detached from the container by rotating the web 84 until the lugs 82 coincide with the slots 83 whereupon, having removed the lid 4, the basket can be separated into its two parts and laid open to view.

The container 3, which may be embodied in any given shape, is provided with at least one outlet 7 at the base.

In a preferred embodiment, the bottom 12 will pitch toward the outlet 7 so as to ensure that water can drain off fully. The shape of the container 3 might be parallelepiped, for example, with a watershed bottom 12 (as in FIGS. 1 and 2).

The outlet 7 will be located at the lowest point of the base, and fitted with a system for varying its aperture, say, a valve. The inclusion of such a variable-passage outlet 7 permits of washing salad or vegetable produce either by immersion, with the outlet 7 fully blocked, or by flooding with the outlet 7 wide open or partly open, as well as of draining water away when the produce is spun dry.

Water can be either poured into the container 3 in direct fashion, with the lid 4 removed, or piped in through a fitting 23 provided at one end.

Figure 5:
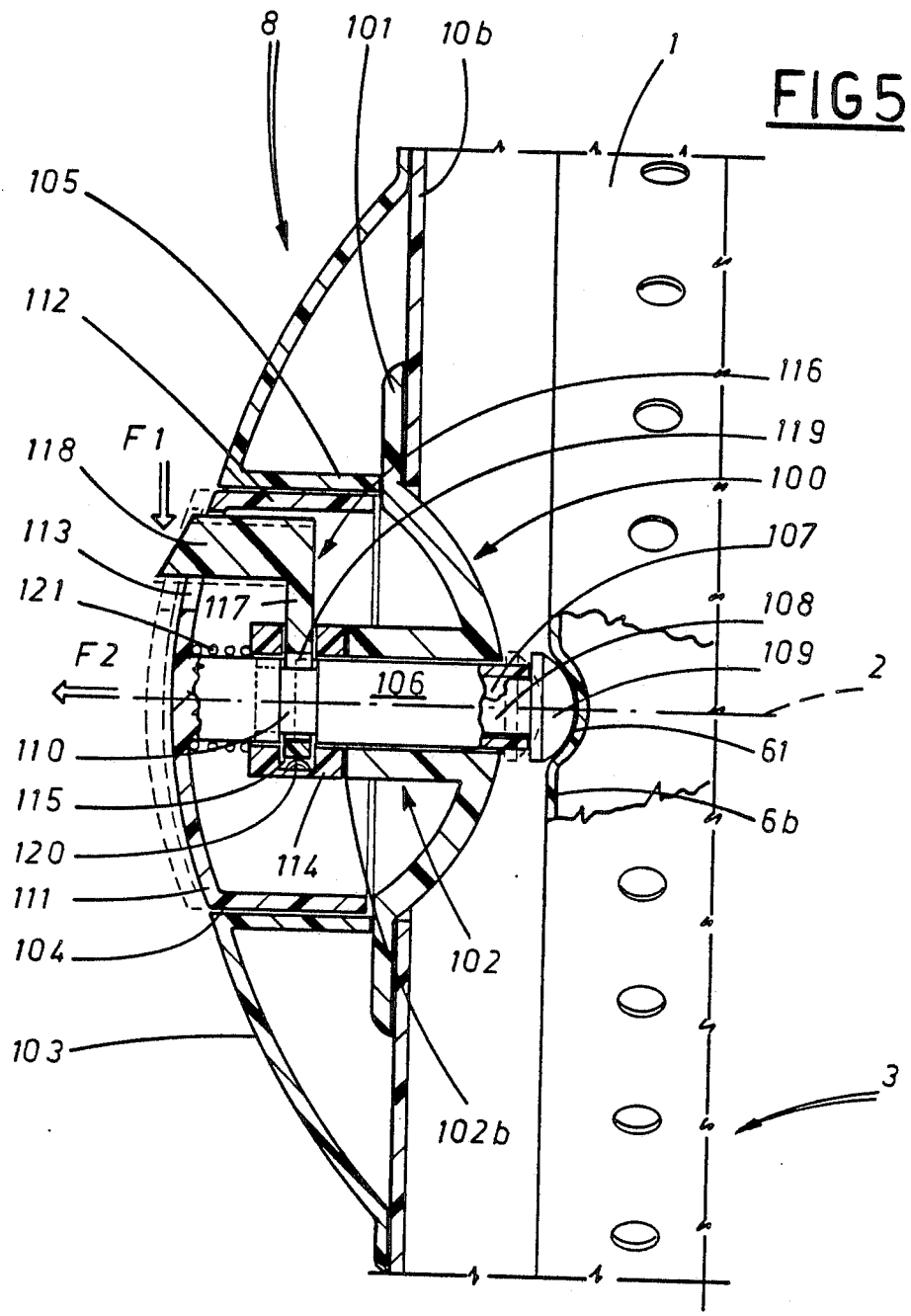
FIG. 5 shows an alternative embodiment, by way of further example, of the device by which the basket is supported and aligned in the appliance disclosed.

FIG. 5 shows an alternative embodiment of the support and alignment means 81, in which use is made of a concave flange 100, welded by way of its rim 101 to the outer surface of the relative side wall 10b of the container 3, a sleeve 102 incorporated centrally into the flange, coaxial with the axis of rotation 2 of the basket, and a cap 103, likewise welded to the side wall 10b along its periphery, and affording a recess 104 disposed coaxial with the sleeve 102, the circular wall 105 of which terminates flush against the rim 101 of the concave flange 100.

The sleeve 102 accommodates a sliding plunger 106, which comprises: a blind hole 107, formed in the end of the plunger directed toward the basket, accepting a fixed pin 108 with a dome head 109 that registers in the bush 61 offered by the side wall 6b of the basket 1; an annular groove 110, cut into the shank of the plunger at a point near the outer edge 102b of the sleeve 102; and a disk 111, associated with the end of the plunger 106 farthest from the basket, the periphery of which is embodied as an external circular wall 112 that matches the internal wall 104 of the cap 103, and the top part of which exhibits a slot 113.

114 denotes a collar, encircling the shank of the plunger 106, which is embodied with a diametral socket 115 and positioned flush against the outer edge 102b of the sleeve 102 in such a way that the socket 115 is aligned with the annular groove 110.

116 denotes a release button the stem 117 of which is slidable within the diametral socket 115 of the collar 114; the head of the button, denoted 118, projects from the slot 113 in the disk 111. A hole denoted 119, formed in the stem 117 of the button, is of diameter marginally greater than that of the plunger shank, and accommodates the sliding motion of the plunger 106.

120 denotes bias spring means that impinge on the stem 117 of the button from the bottom of the socket 115 in such a way that the button is urged up into a position whereby the bottom of the stem occupies the annular groove 110 and inhibits any axial movement of the plunger 106 internally of the sleeve 102.

121 denotes return spring means, encircling the plunger 106 and compressed between the collar 114 and the disk 111.

To release the basket 1, the user simply presses down the head 118 of the button 116 in the direction of the arrow denoted F1 so as to counter the spring bias 120 and bring the hole 119 in the stem 117 into coaxial alignment with the plunger 106, whereupon the plunger can shift in the direction of the arrow denoted F2 under the force of the return spring 121 and withdraw the dome head 109 of the pin 108 from the bush 61 in the side wall of the basket.

The phantom lines of FIG. 5 serve to illustrate the position assumed by the plunger 106 when the basket is released from the container.

What is claimed:

1. An appliance for washing and spin-drying lettuce, vegetables and similar produce, comprising:
   a revolving basket that separates into at least two parts and is rotatable about a horizontally disposed axis of symmetry internally of a container fitted uppermost with a removable lid;
   means for supporting and driving the basket, said means being mounted to one side wall of the container and engaging one side wall of the basket and wherein said supporting and driving means comprises:
   a cover, disposed coaxially with and rigidly attached to the container and exhibiting a concentric outward facing annular recess, which incorporates a first, central, hollow pivot to which the revolving basket is journalled, a second pivot, offset from center and carrying a planet gear that meshes with a gear attached directly to the basket, and an opening that serves to admit the planet gear, and a disk, carried by and freely rotatable in relation to the cover, having an internal ring gear that projects from one face, is accommodated by the annular recess in the cover, and meshes with the planet gear, said disk being provided with a knob on the one side, in a position offset from the axis of symmetry about which the basket rotates, and said disk being provided on the other side with a centrally located, diametrally flexible pivot that passes through the hollow pivot of the cover;

means for supporting and aligning the basket, which means for supporting and aligning can be fastened to and detached from the side wall of the container opposite from that occupied by the support and drive means, and which means for supporting and aligning engage with the side wall of the basket opposite from that engaged by the support and drive means; and at least one outlet of variable aperture located at the base of the container and serving to discharge water contained therein.

2. An appliance as in claim 1, wherein the basket side wall engaged by the support and drive means is provided with a centrally located bush that carries a gear on its outer surface, and accommodates the first hollow pivot of the cover and the flexible pivot of the disk, both coaxially; and wherein a projecting end of the diametrally flexible pivot the disk terminates in a ring by which it is retained axially within the hollow pivot of the cover.

3. An appliance as in claim 1, wherein the outlet is located at the base of the container, and the container bottom slopes downward toward the outlet.

4. An appliance as in claim 1, wherein the outlet of the container is of the type having an adjustable aperture.

5. An appliance as in claim 1, wherein the two parts making up the basket are joined and separated by way of a quick fit arrangement, and embodied such as to enable transmission of rotary motion from one to the other.

6. An appliance as in claim 1, wherein the basket is pierced with a plurality of holes distributed over its entire surface.

7. An appliance as in claim 1, wherein the basket is provided internally with a plurality of ribs that converge substantially toward its center.

8. An appliance as in claim 1, wherein the container is provided with a fitting through which water can be supplied to the interior.

9. An appliance for washing and spin-drying produce, comprising:

a container having a removable lid;

a revolving basket that separates into at least two parts and is rotatable about a horizontally disposed axis of symmetry internally of the container;

means for supporting and driving the basket, said means being mounted to one side wall of the container and engaging one side wall of the basket;

means for supporting and aligning the basket, which means for supporting and aligning can be fastened to and detached from a side wall of the container opposite from that occupied by the support and drive means, and which means for supporting and aligning engage with the side wall of the basket opposite from that engaged by the support and drive means, wherein the basket is supported and aligned by means comprising:

a cover, of which the face offered to the basket carries a pivot, centrally located and coaxial with the axis of symmetry about which the basket rotates, which serves to support and align the revolving basket and registers internally of a further bush afforded by the side wall of the basket opposite from the side wall engaged by the drive means, and means by which the cover is fastened to and centered in the relative side wall of the container, embodied as a set of at least two inward facing L-shaped lugs disposed parallel with the cover, spaced apart at equal distance one from the next, and designed to engage in corresponding slots provided in the wall of the container; and, at least one variable aperture outlet located at a base of the container and serving to discharge water contained therein.

10. An appliance as in claim 9, wherein the cover of the support and alignment means fastens to the container in watertight fashion and is detachable therefrom, and incorporates a centrally located web that issues from the side opposite that carrying the pivot and is gripped to the end of rotating the cover one way or the other when fitted to the side all of the container with the lugs located in the respective slots.

11. An appliance as in claim 9, wherein means by which the cover is attached and centered comprise three lugs spaced apart at approximately 120° one from the next.

12. An appliance for washing and spin-driving produce, comprising:

a container having a lid;

a revolving basket that separates into at least two parts and is rotatable about a horizontally disposed axis of symmetry internally of the container;

means for supporting and driving the basket, said means being mounted to one side wall of the container and engaging one side wall of the basket;

means for supporting and aligning the basket, which supporting and aligning means can be fastened to and detached from the side wall of the container opposite from that occupied by the support and drive means, and which supporting and aligning means engage with the side wall of the basket opposite from the engaged by the support and drive means, wherein the basket is supported and aligned by means comprising:

a concave flange, rendered integral by way of its rim to the outer surface of the relative side wall of the container, and incorporating a centrally located sleeve coaxial with the axis of symmetry about which the basket rotates, a cap, likewise integral with the side wall of the container and affording a recess, disposed coaxial with the sleeve, the circumferential internal wall of which terminates flush against the rim of the concave flange, a plunger, slidably accommodated by the sleeve and comprising:

a blind hole, formed in the end of the plunger directed at the basket and accepting a fixed pin with a dome head that registers in the bush offered by the relative side wall of the basket, an annular groove, cut into the shank of the plunger at a point near the outermost edge of the sleeve and, a disk, associated with the end of the plunger farthest from the basket, the periphery of which is embodied as an external circular wall that matches the internal wall of the cap, and the top part of which exhibits a slot, a collar, encircling the plunger, which is embodied with a diametral socket and positioned flush against the outermost edge of the sleeve in such a way that the diametral socket is aligned with the annular groove, a release button, comprising a stem accommodated slidably in the diametral socket of the collar, a head that projects from the slot in the disk, and a hole, formed in the stem of the button, of a diameter marginally greater than that of the plunger;

bias spring means that impinge on the stem of the button from the bottom of the socket in such a way that the button is urged up into a positive whereby the bottom of the stem occupies the annular groove and inhibits axial movement of the plunger within the sleeve, and return spring means, encircling the plunger and compressed between the collar and the disk; and, at least one variable aperture outlet located at the base of the container and serving to discharge water container therein.

* * * * *